(12) United States Patent
Nakamura et al.

(10) Patent No.: US 11,584,323 B2
(45) Date of Patent: *Feb. 21, 2023

(54) OCCUPANT MONITORING DEVICE FOR VEHICLE AND OCCUPANT PROTECTION SYSTEM FOR VEHICLE

(71) Applicant: SUBARU CORPORATION, Tokyo (JP)

(72) Inventors: Ryota Nakamura, Tokyo (JP); Junpei Tokizaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 838 days.

This patent is subject to a terminal disclaimer.

(21) Appl. No.: 16/444,086

(22) Filed: Jun. 18, 2019

(65) Prior Publication Data

US 2020/0094762 A1 Mar. 26, 2020

(30) Foreign Application Priority Data

Sep. 26, 2018 (JP) .............................. JP2018-180059

(51) Int. Cl.
*G08B 21/22* (2006.01)
*B60R 21/015* (2006.01)
(Continued)

(52) U.S. Cl.
CPC .......... *B60R 21/01538* (2014.10); *B60Q 3/76* (2017.02); *H04N 5/2354* (2013.01)

(58) Field of Classification Search
CPC ........ B60R 21/01538; B60R 21/01512; B60R 21/01552; B60Q 3/76; H04N 5/2354; H04N 5/2256
See application file for complete search history.

(56) References Cited

U.S. PATENT DOCUMENTS

2002/0003571 A1* 1/2002 Schofield .............. B60S 1/0885
　　　　　　　　　　　　　　　　　　　　　　348/148
2008/0234899 A1　9/2008 Breed et al.
(Continued)

FOREIGN PATENT DOCUMENTS

CN　　2020-41659 U　11/2011
CN　　104943647 A　6/2019
(Continued)

OTHER PUBLICATIONS

Japanese Office Action cited in JP2018-180059, dated Aug. 2, 2022.
(Continued)

*Primary Examiner* — Howard D Brown, Jr.

(74) *Attorney, Agent, or Firm* — Chip Law Group

(57) ABSTRACT

A vehicle occupant monitoring device for a vehicle is configured to monitor an occupant sitting on a seat provided in a vehicle and includes a light projector, an imaging device, and a processor. The light projector is configured to project light toward the occupant sitting on the seat. The imaging device is configured to capture an image of the occupant sitting on the seat. The processor is configured to control the light projector and the imaging device to capture the image of the occupant sitting on the seat. In a case where a collision of the vehicle is predicted, the processor causes the light projector to radiate intense light toward a head of the occupant to be imaged by the imaging device.

14 Claims, 10 Drawing Sheets

(51) Int. Cl.
*H04N 5/235* (2006.01)
*B60Q 3/76* (2017.01)

(56) References Cited

U.S. PATENT DOCUMENTS

| | | | |
|---|---|---|---|
| 2012/0140080 A1* | 6/2012 | Taylor | G01S 13/862 348/148 |
| 2014/0168441 A1* | 6/2014 | Koike | B60R 21/01538 348/148 |
| 2015/0274110 A1 | 10/2015 | Ishida et al. | |
| 2017/0291548 A1 | 10/2017 | Kim et al. | |
| 2020/0094762 A1* | 3/2020 | Nakamura | B60Q 3/76 |

FOREIGN PATENT DOCUMENTS

| | | |
|---|---|---|
| JP | H11043009 | 2/1999 |
| JP | 2004-148881 A | 5/2004 |
| JP | 2005-247014 A | 9/2005 |
| JP | 2007-168570 A | 7/2007 |
| JP | 2009-113747 | 5/2009 |
| JP | 2015014146 | 8/2015 |

OTHER PUBLICATIONS

Chinese Office Action cited in CN201910561417.8, dated Aug. 3, 2022.

\* cited by examiner

OCCUPANT MONITORING DEVICE FOR VEHICLE AND OCCUPANT PROTECTION SYSTEM FOR VEHICLE

CROSS-REFERENCE TO RELATED APPLICATIONS

The present application claims priority from Japanese Patent Application No. 2018-180059 filed on Sep. 26, 2018, the entire contents of which are hereby incorporated by reference.

BACKGROUND

The disclosure relates to occupant monitoring devices for vehicles and to occupant protection systems for vehicles.

Japanese Unexamined Patent Application Publication Nos. 11-043009 and 2015-140146 each disclose an occupant monitoring device that monitors on-board occupants in vehicles.

SUMMARY

An aspect of the disclosure provides an occupant monitoring device for a vehicle configured to monitor an occupant sitting on a seat provided in the vehicle and including a light projector, an imaging device, and a processor. The light projector is configured to project light toward the occupant sitting on the seat. The imaging device is configured to capture an image of the occupant sitting on the seat. The processor is configured to control the light projector and the imaging device to capture the image of the occupant sitting on the seat. In a case where a collision of the vehicle is predicted, the processor causes the light projector to radiate intense light toward a head of the occupant to be imaged by the imaging device.

A second aspect of the disclosure provides an occupant protection system for a vehicle including the occupant monitoring device for a vehicle and an occupant protection device configured to execute occupant protection control based on the image of the occupant captured by the vehicle occupant monitoring device.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
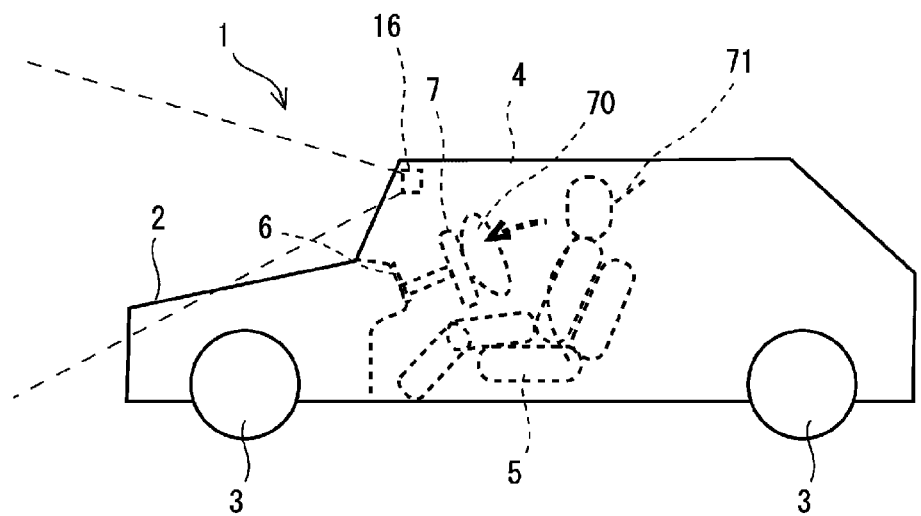
FIG. 1 illustrates occupant protection in an automobile according to an embodiment of the disclosure.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. It is conceivable that the position and behavior of the head of an occupant are predicted in the event of a collision by capturing an image of the head of the occupant during the collision, and that occupant protection control is executed accordingly.

However, a vehicle occupant monitoring device normally captures an image of the entire upper body of the occupant sitting on a seat.

Therefore, the head of the occupant is not necessarily clear in the captured image. For example, if the interior of the vehicle is dark when the vehicle is driven at nighttime, the head of the occupant is less likely to be clear in the captured image.

If the head of the occupant is not clear in the captured image, it may be difficult to properly identify the position of the head of the occupant in the image, thus making it difficult to accurately determine the behavior as a change in the position of the head of the occupant.

As a result, it may possibly be difficult to execute proper occupant protection control that can be expected as a result of using the occupant monitoring device by properly predicting the position and movement of the head of the occupant during the collision.

Accordingly, in the vehicle, it is demanded that the position and behavior of the head of the occupant sitting on the seat be properly identified based on the image captured by the occupant monitoring device.

FIG. 1 illustrates occupant protection in an automobile 1 according to an embodiment of the disclosure. In FIG. 1, an onboard imaging device 53 that captures a vehicle-exterior image is illustrated.

The automobile 1 is an example of a movable vehicle that accommodates one or more people. Other examples of the vehicle include a large-size vehicle, a two-wheeled vehicle, a personal mobility vehicle, a bicycle, a railway vehicle, an airplane, and a boat.

The automobile 1 in FIG. 1 includes a vehicle body 2, wheels 3 provided at the front and rear of the vehicle body 2, a seat 5 provided in an occupant compartment 4 of the vehicle body 2, a dashboard 6 provided in front of the seat 5, and a steering wheel 7 protruding rearward from the dashboard 6.

In such an automobile 1, an occupant boarding the occupant compartment 4 of the vehicle body 2 sits on the seat 5. Moreover, the occupant operates, for example, the steering wheel 7. The automobile 1 travels in accordance with the operation performed by the occupant by using a driving force of an engine and a motor (not illustrated).

Furthermore, for example, a destination is set in the automobile 1, so that the automobile 1 guides a route to the destination and travels automatically along the route to the destination.

Figure 2:
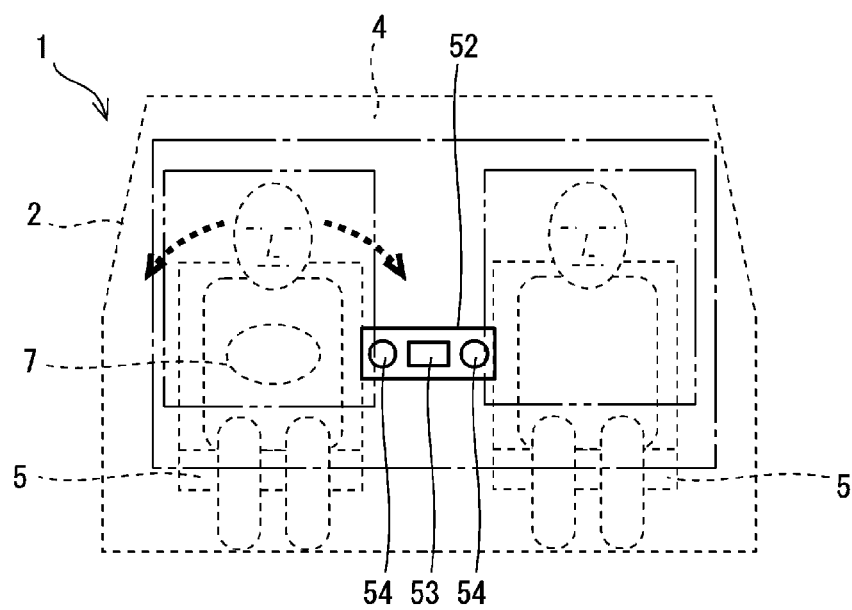
FIG. 2 illustrates the behavior of occupants, in the left-right direction, in the automobile in FIG. 1.

FIG. 2 illustrates the behavior of occupants, in the left-right direction, in the automobile 1 in FIG. 1.

FIG. 2 is a front view of the automobile 1 in FIG. 1 and illustrates two occupants sitting on a pair of left and right seats 5. The upper body of each occupant sitting on the corresponding seat 5 may tilt leftward or rightward on the seat 5 when the automobile 1 makes, for example, a right or left turn.

Figure 3:
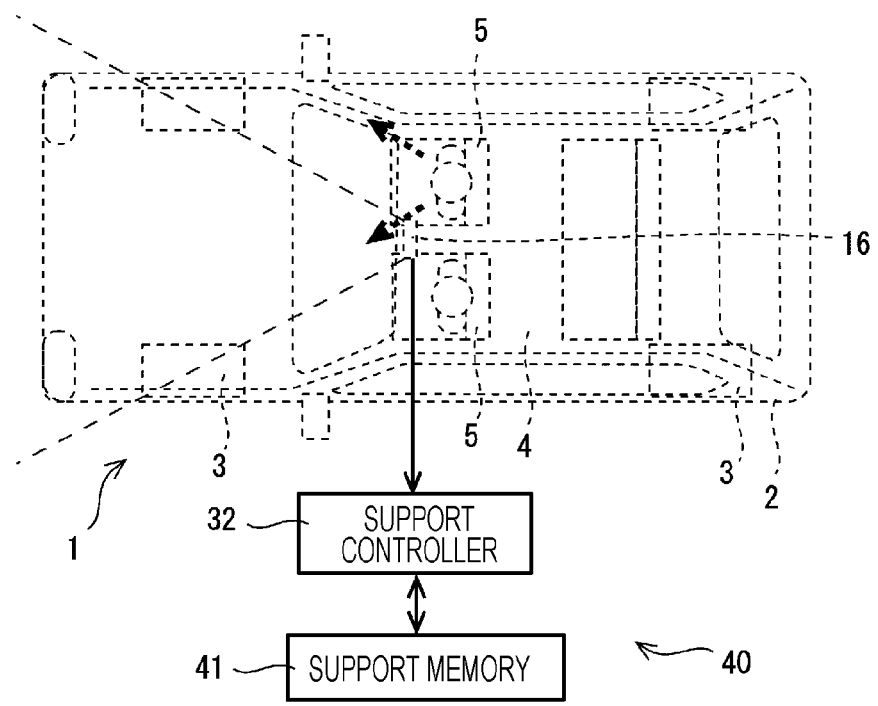
FIG. 3 illustrates the behavior of the occupants, in the diagonally forward direction, in the automobile in FIG. 1.

FIG. 3 illustrates the behavior of the occupants, in the diagonally forward direction, in the automobile 1 in FIG. 1.

FIG. 3 is a top view of the automobile 1 in FIG. 1 and illustrates two occupants sitting on the pair of left and right seats 5. The upper body of each occupant sitting on the corresponding seat 5 may tilt diagonally forward during, for example, braking of the automobile 1.

As illustrated in FIG. 1, the upper body of the occupant sitting on the seat 5 may tilt forward during, for example, braking of the automobile 1.

If excessive acceleration is not applied, the behavior of the upper body of the occupant is not significant.

However, for example, in the event of a collision, an excessive impact occurring during the collision may cause the upper body of the occupant to tilt greatly so as to protrude out from the seat 5.

Therefore, in order to support the upper body of each occupant sitting on the corresponding seat 5, an occupant protection device 60 including an airbag member 70 and a seatbelt member 71, as illustrated in FIG. 1, is used in the automobile 1.

The seatbelt member 71 has a belt extended across the front of the occupant sitting on the seat 5. The seatbelt member 71 actuates a belt actuator 63 in the event of a collision so as to apply tension to the belt. Consequently, in the event of a collision, the upper body of the occupant sitting on the seat 5 is supported by the belt, so that the upper body is less likely to protrude any further from the seat 5.

The airbag member 70 deploys an airbag 64 by using gas generated by an inflator in the event of a collision. In FIG. 1, the airbag 64 deploys at the rear side of the steering wheel 7, that is, in front of the upper body of the occupant sitting on the seat 5. Consequently, the upper body of the occupant tilting forward from the seat 5 abuts on the airbag 64. The airbag 64 deforms due to the load of the occupant, so as to absorb the kinetic energy acting on the upper body of the occupant.

With such an occupant protection device 60, the automobile 1 is capable of protecting the occupants even in the event of a collision.

Examples of a collision of the automobile 1 include a frontal collision in which another vehicle collides with the front of the vehicle body 2, an offset collision in which another vehicle collides with a front corner of the vehicle body 2, and a lateral collision in which another vehicle collides with a side surface of the vehicle body 2.

The occupant protection device 60 desirably has a function of protecting occupants in the event of any one of these examples of collisions.

In the automobile 1, it is conceivable that the occupant protection function of the occupant protection device 60 is improved by using the occupant monitoring device 50 provided in the automobile 1.

As illustrated in FIG. 2, the occupant monitoring device 50 captures an image of each occupant sitting on the corresponding seat 5 by using an optical device provided in the dashboard 6, and warns the occupant by detecting dozing and inattentive driving.

It is conceivable that the position and behavior of the head of each occupant sitting on the corresponding seat 5 are predicted by capturing an image of the occupant by using the occupant monitoring device 50, and the operation of the airbag member 70 and the operation of the seatbelt member 71 are controlled accordingly in the occupant protection device 60.

However, in order to detect dozing and inattentive driving of the occupant, the occupant monitoring device 50 normally captures an image of the entire upper body of the occupant sitting on the seat 5.

Therefore, the head of the occupant is not necessarily clear in the captured image. For example, if the interior of the vehicle is dark when the vehicle is driven at nighttime, the head of the occupant is less likely to be clear in the captured image.

If the head of the occupant is not clear in the captured image, it may be difficult to properly identify the position of the head of the occupant in the captured image, thus making it difficult to accurately determine the behavior of the head of the occupant as an uncertain change in the position of the head of the occupant.

As a result, it may possibly be difficult to execute proper occupant protection control that can be expected as a result of using the occupant monitoring device 50 by properly predicting the position and movement of the head of the occupant during the collision.

Accordingly, in the automobile 1, it is demanded that the occupant protection function be further improved.

Figure 4:
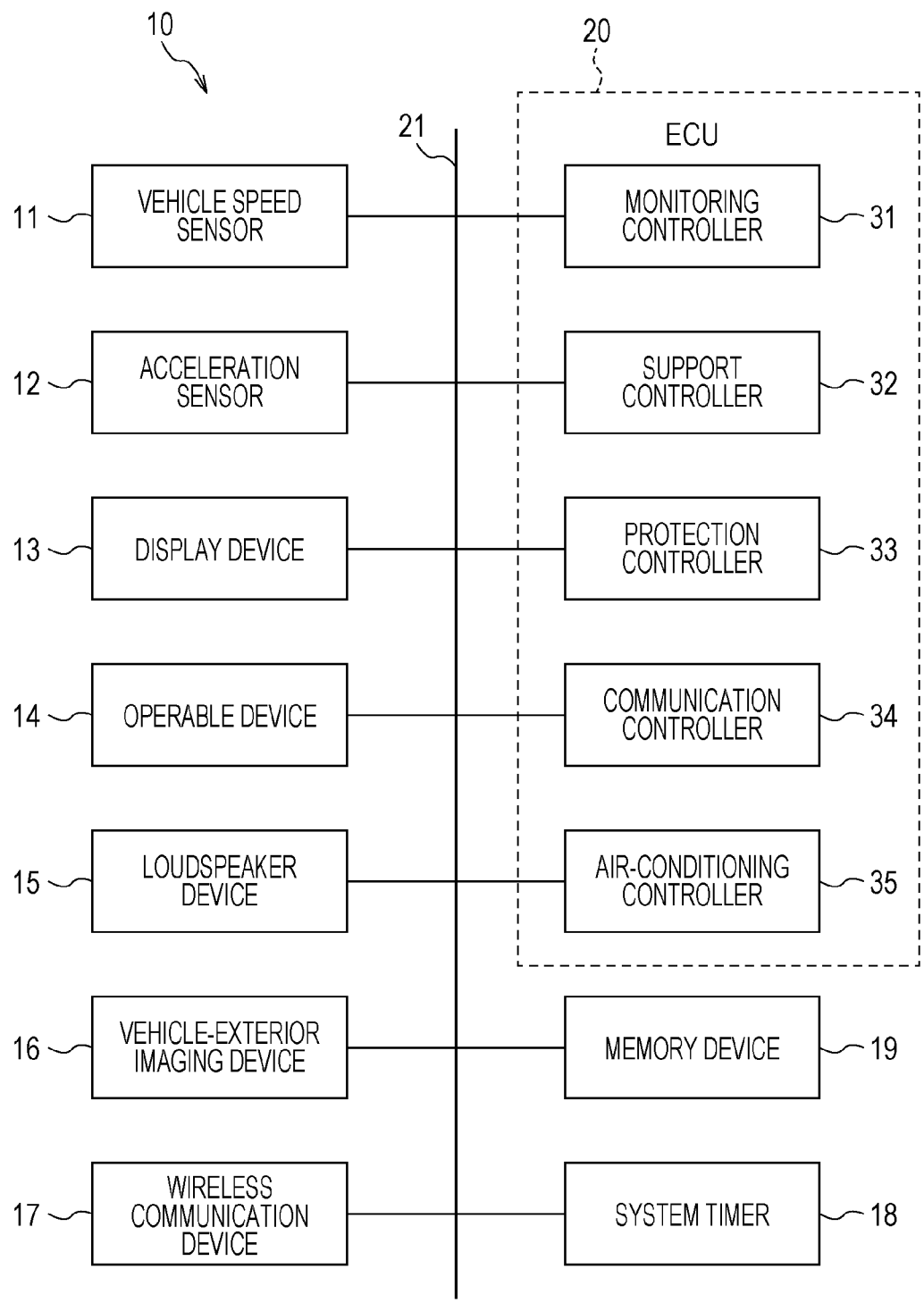
FIG. 4 illustrates a vehicle control system as an occupant protection system provided in the automobile in FIG. 1.

FIG. 4 illustrates a vehicle control system 10 as an occupant protection system provided in the automobile 1 in FIG. 1.

The vehicle control system 10 in FIG. 4 includes a vehicle speed sensor 11, an acceleration sensor 12, a display device 13, an operable device 14, a loudspeaker device 15, a vehicle-exterior imaging device 16, a wireless communication device 17, a system timer 18, a memory device 19, an electronic control unit (ECU) 20, and a vehicle-interior network 21 to which these devices are coupled.

The vehicle-interior network 21 includes, for example, a wired communication network compliant with a controller area network (CAN), a local interconnect network (LIN), and so on. The devices coupled to the vehicle-interior network 21 are distributively disposed at respective locations of the vehicle body 2 and exchange data with one another via the vehicle-interior network 21. The devices coupled to the vehicle-interior network 21 may individually be provided with central processing units (CPUs) for exchanging data via the vehicle-interior network 21, and may each serve as an individual device.

The vehicle speed sensor 11 detects a speed according to, for example, movement of the vehicle body 2 of the automobile 1 and outputs the speed to the vehicle-interior network 21.

The acceleration sensor 12 detects acceleration acting on the vehicle body 2 of the automobile 1 and outputs the acceleration to the vehicle-interior network 21. If impacts input to the vehicle body 2 from a plurality of directions are to be detected, a plurality of acceleration sensors 12 may be provided in the automobile 1 such that they are distributively provided near the outer peripheral surface of the vehicle body 2.

The display device 13 acquires display data from the vehicle-interior network 21 and displays an image based on the display data.

The operable device 14 is provided in, for example, the occupant compartment 4 and is to be operated by the occupant. The operable device 14 includes, for example, the steering wheel 7, a select lever, and a brake pedal.

The loudspeaker device 15 acquires sound data from the vehicle-interior network 21 and outputs sound based on the sound data.

The vehicle-exterior imaging device 16 is provided in, for example, the occupant compartment 4 of the automobile 1, captures an image of the surroundings of the automobile 1, and outputs the image data to the vehicle-interior network 21. For example, the vehicle-exterior imaging device 16 is provided facing forward near the ceiling of the occupant compartment 4, as illustrated in FIG. 1. In this case, the vehicle-exterior imaging device 16 captures an image of the front of the automobile 1.

The wireless communication device 17 communicates wirelessly with, for example, another device not coupled to the vehicle-interior network 21, such as another vehicle located outside the automobile 1, a base station, and a beacon device, and exchanges data therewith.

The system timer 18 measures a time period or a time point. The system timer 18 outputs the measured time period or time point to the devices coupled to the vehicle-interior network 21 via the vehicle-interior network 21. Thus, the plurality of devices coupled to the vehicle-interior network 21 can operate synchronously in accordance with, for example, the time point measured by the system timer 18.

The memory device 19 stores programs and data to be used for vehicle control by the ECU 20. The memory device 19 may be, for example, either one of a semiconductor memory device and a hard disk device.

The ECU 20 is a computer equipped with a CPU, such as a one-chip microcomputer. The one-chip microcomputer may contain the system timer 18 and the memory device 19 in addition to the CPU. The ECU 20 reads and executes a program stored in the memory device 19. Accordingly, a controller that controls the overall operation of the automobile 1 is realized in the ECU 20. The automobile 1 may be provided with a plurality of ECUs 20. In this case, the plurality of ECUs 20 operate in cooperation with each other to function as a controller.

In FIG. 4, an occupant monitoring controller 31, a driving support controller 32, a protection controller 33 for occupants, a communication controller 34, and an air-conditioning controller 35 are illustrated as the functions of the controller realized in the ECU 20.

The communication controller 34 manages data communication performed by the wireless communication device 17 and constitutes a wireless communication apparatus of the automobile 1, together with the wireless communication device 17. The communication controller 34 uses the wireless communication device 17 to exchange data, for controlling the driving of the automobile 1, with, for example, a server device of a traffic system (not illustrated), another vehicle corresponding to the traffic system, and so on.

The air-conditioning controller 35 controls air-conditioning operation in the occupant compartment 4 of the automobile 1.

The driving support controller 32 constitutes a driving support device 40 for the automobile 1, together with the vehicle-exterior imaging device 16 and a support memory 41 in FIG. 3. For example, the support memory 41 may be provided as a part of the memory device 19. Based on the settings of the support memory 41, the support controller 32 extracts structural objects surrounding the automobile 1, such as another vehicle, a pedestrian, a bicycle, a wall, and so on, from a vehicle-exterior image captured by the vehicle-exterior imaging device 16, and generates information about the distance and direction between the automobile 1 and each extracted object. The support controller 32 creates a path of the automobile 1 such that the automobile 1 does not intersect with or come close to the extracted objects and the paths of the objects, and controls the movement of the automobile 1 so that the automobile 1 travels along the created path. In that case, for example, if the occupant operates the operable device 14, such as the steering wheel 7, the support controller 32 assists with the movement of the automobile 1 such that the automobile 1 travels along a complemented path of the path according to the operation of the operable device 14.

Furthermore, the support controller 32 determines a possibility of an unavoidable collision with, for example, another vehicle by performing a process in FIG. 9, to be described later, and predicts a collision if the possibility is high.

Figure 5:
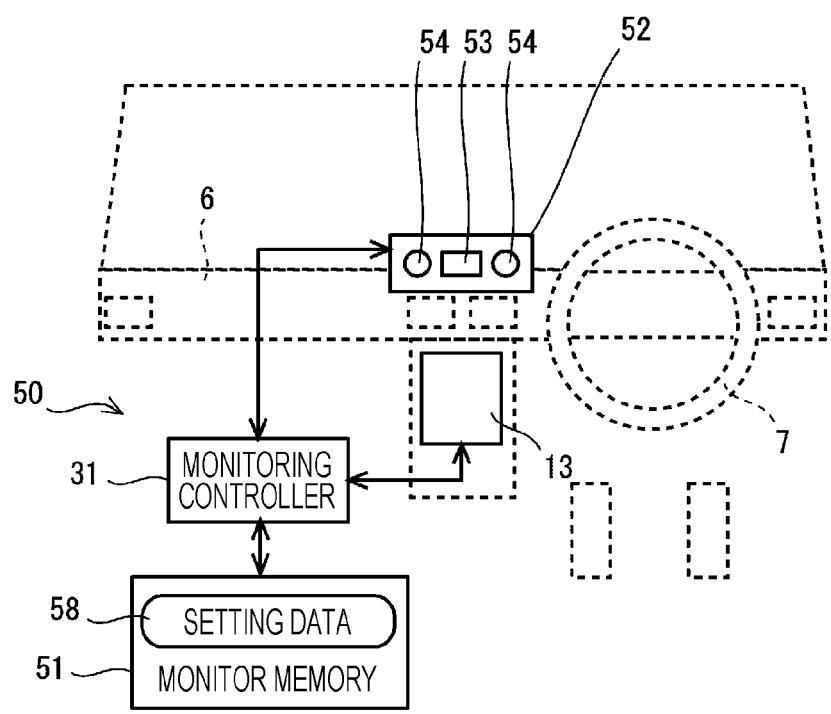
FIG. 5 illustrates an occupant monitoring device provided in the automobile in FIG. 1.

FIG. 5 illustrates the occupant monitoring device 50 provided in the automobile 1 in FIG. 1.

The occupant monitoring device 50 in FIG. 5 includes a monitor memory 51 and an optical unit 52, in addition to the occupant monitoring controller 31 in FIG. 4. The occupant monitoring device 50 monitors the occupants sitting on the seats 5 provided in the automobile 1.

As illustrated in FIGS. 5 and 2, the optical unit 52 is provided facing rearward in a central region of the dashboard 6 in the occupant compartment 4. The optical unit 52 includes the onboard imaging device 53 and a pair of light projectors 54.

The onboard imaging device 53 is provided facing rearward in the central region of the dashboard 6 in the occupant compartment 4. As indicated by a single-dot chain frame in FIG. 2, the onboard imaging device 53 captures an image of the entire upper bodies of the two occupants sitting on the pair of left and right seats 5 provided side-by-side in the vehicle-width direction for the respective occupants in the occupant compartment 4.

Each light projector 54 is provided facing rearward in the central region of the dashboard 6 in the occupant compartment 4. As indicated by a two-dot chain frame in FIG. 2, each light projector 54 projects nonvisible light, such as infrared light, onto the entire upper body of the occupant who is sitting on the corresponding seat 5 and whose image is to be captured by the onboard imaging device 53. For capturing the image of the faces of the occupants, the light projectors 54 are provided forward of the seated positions on the seats 5.

For example, the monitor memory 51 may be provided as a part of the memory device 19. The monitor memory 51 stores, for example, setting data 58 used for monitoring the occupants.

Figure 8:
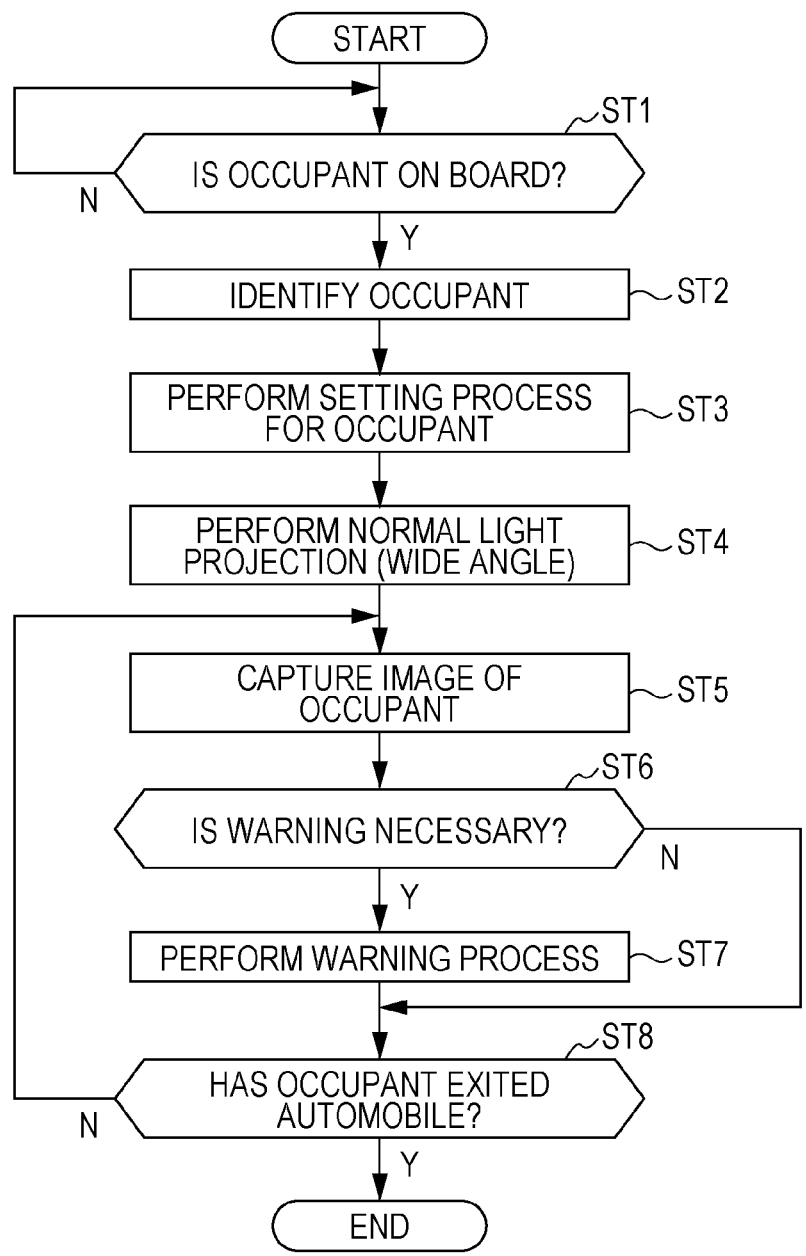
FIG. 8 is a flowchart illustrating a process performed in a normal mode by a monitoring controller in FIG. 5.

As illustrated in FIG. 8 to be described later, the monitoring controller 31 controls the light projectors 54 and the onboard imaging device 53 based on the setting data 58 in the monitor memory 51, determines the position and movement of the upper body of each occupant sitting on the corresponding seat 5 from a vehicle-interior image captured by the onboard imaging device 53, and determines whether the occupant is dozing or driving inattentively in accordance with the position and movement of the upper body. If the occupant is dozing or driving inattentively, the monitoring controller 31 uses the display device 13 and the loudspeaker device 15 to output a warning. Alternatively, the monitoring controller 31 may determine the orientation of the occupant's face and the movement of the occupant's eyes from the captured image and may output a warning about dozing or inattentive driving accordingly.

Furthermore, if a collision is predicted, the monitoring controller 31 executes occupant monitoring control for protecting the occupants during a collision in accordance a process in FIG. 10, to be described later.

Figure 6A:
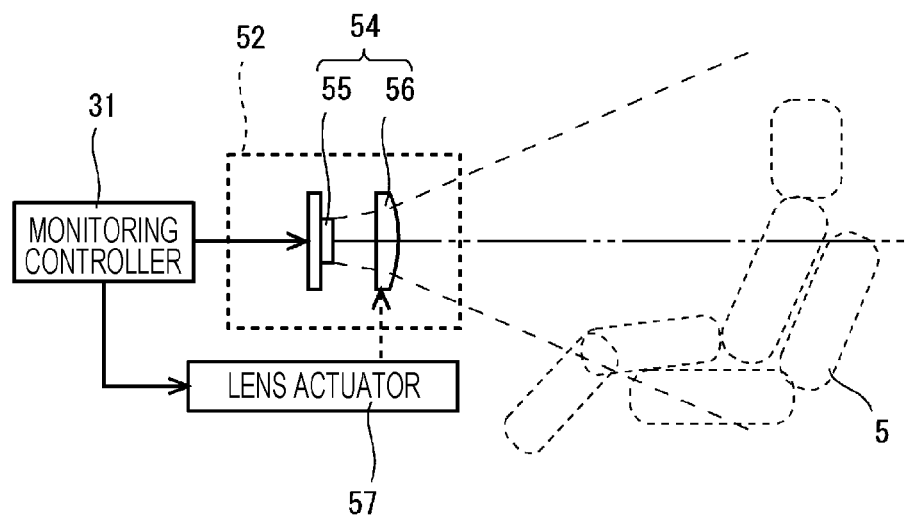
FIGS. 6A and 6B illustrate a state where light is projected onto an occupant by a light projector in FIG. 5.
Figure 6B:
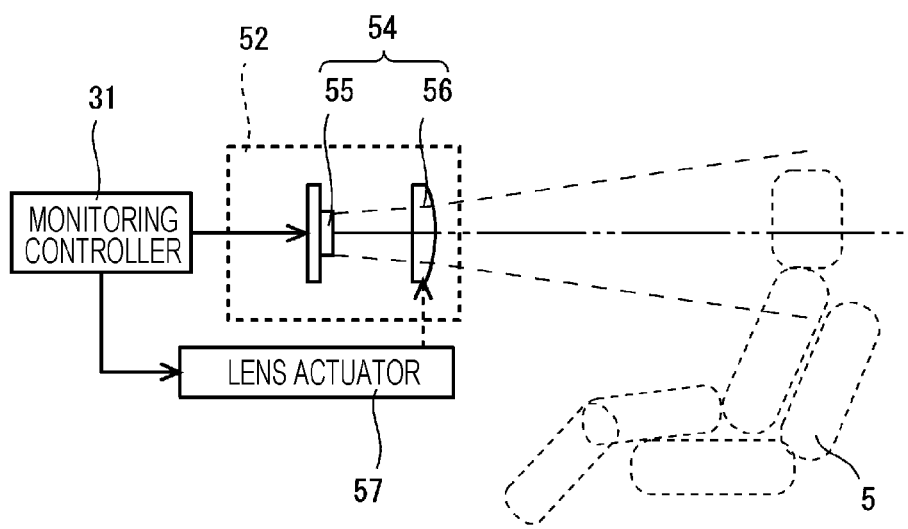

FIGS. 6A and 6B illustrate a state where light is projected onto each occupant by the corresponding light projector 54 in FIG. 5.

As illustrated in FIGS. 6A and 6B, the light projector 54 includes a light emitter 55, a lens 56 as an optical member, and a lens actuator 57.

The light emitter 55 is a diode that emits, for example, infrared light.

The lens 56 is movable along the optical axis of the light emitter 55. The lens 56 collects light from the light emitter 55 and radiates the light onto the occupant sitting on the seat 5.

The lens actuator 57 is controlled by the monitoring controller 31 so as to drive the lens 56 in the optical-axis direction of the light emitter 55.

As illustrated in FIG. 6A, in a case where the lens 56 is located within a normal control range near the light emitter 55, the light collected by the lens 56 is radiated onto the entire upper body of the occupant sitting on the seat 5.

As illustrated in FIG. 6B, in a case where the lens 56 is located outside the normal control range distant from the light emitter 55, the light collected by the lens 56 is radiated at a narrow angle onto the head of the occupant sitting on the seat 5.

Accordingly, the light projector 54 has an adjustable focusing lens so as to be capable of switching between a wide-angle light projection mode in FIG. 6A and a narrow-angle light projection mode in FIG. 6B.

Figure 7:
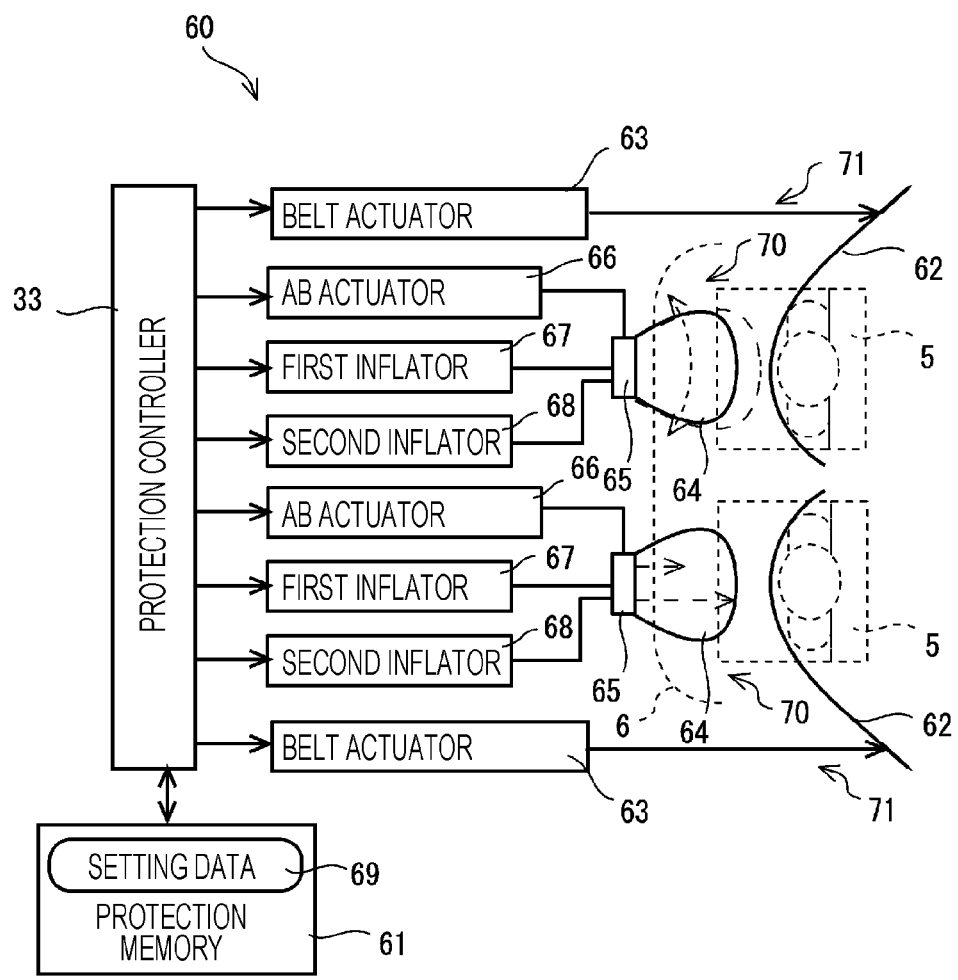
FIG. 7 illustrates an occupant protection device provided in the automobile in FIG. 1.

FIG. 7 illustrates the occupant protection device 60 provided in the automobile 1 in FIG. 1.

The occupant protection device 60 in FIG. 7 includes a protection memory 61, a plurality of seatbelts 62, a plurality of belt actuators 63, a plurality of airbags 64, a plurality of base members 65, a plurality of airbag actuators (AB actuators) 66, and a plurality of inflators 67 and 68, in addition to the protection controller 33 for the occupants in FIG. 4.

One set of a seatbelt 62 and a belt actuator 63 constitutes a single seatbelt member 71.

One set of an airbag 64, a base member 65, an airbag actuator 66, a first inflator 67, and a second inflator 68 constitutes a single airbag member 70.

In other words, in FIG. 7, two sets of seatbelt members 71 and two sets of airbag members 70 are illustrated in correspondence with the pair of left and right seats 5.

Each seatbelt 62 is a belt extended across the front of the waist and the upper body of the occupant sitting on the corresponding seat 5.

Each belt actuator 63 applies variable tension to the corresponding seatbelt 62. The seatbelt 62 receiving the tension may function to press the waist and the upper body of the occupant against the seat 5.

The airbags 64 are bags that are deployed instantaneously by high-pressure gas.

The first inflators 67 and the second inflators 68 generate high-pressure gas to be injected into the airbags 64. In a case where the first inflators 67 and the second inflators 68 are both actuated, the airbags 64 can be deployed with high pressure. In a case where the first inflators 67 or the second inflators 68 are actuated, the airbags 64 can be deployed with low pressure. By starting the operation of the first inflators 67 and the operation of the second inflators 68 at different timings, the airbags 64 can be deployed with a pressure change different from that when the inflators are actuated at the same timing.

Each base member 65 has the corresponding airbag 64 attached thereto and accommodates the airbag 64 in a folded state. The first inflators 67 and the second inflators 68 may also be provided in the base members 65.

Each airbag actuator 66 drives the corresponding base member 65 and adjusts either one of the position and the orientation of the base member 65. If the base member 65 is attached to the vehicle body 2 in a movable manner in, for example, the vehicle-width direction, the front-rear direction, and the up-down direction, the airbag actuator 66 slidably drives the base member 65 to adjust the position thereof.

If the base member 65 is provided in a rotatable manner at the attached position, the airbag actuator 66 rotatably drives the base member 65 to adjust the orientation thereof.

For example, the protection memory 61 may be provided as a part of the memory device 19. The protection memory 61 stores, for example, setting data 69 used for protecting the occupants.

The protection controller 33 for the occupants constitutes the occupant protection device 60 of the automobile 1, together with the acceleration sensor 12, and the airbag member 70 and the seatbelt member 71 illustrated in FIG. 1. When the protection controller 33 determines that the acceleration sensor 12 has detected acceleration exceeding a threshold value corresponding to an impact of a collision based on the settings in the memory device 19, the protection controller 33 executes protection control for the occupants. In order to protect each occupant, the protection controller 33 deploys the airbag 64 of each airbag member 70 and applies tension to the seatbelt 62 of each seatbelt member 71.

If a collision of the automobile 1 is predicted, the protection controller 33 executes occupant protection control based on an occupant image captured by the occupant monitoring device 50.

FIG. 8 is a flowchart illustrating a process performed in a normal mode by the monitoring controller 31 in FIG. 5.

When the power of the vehicle control system 10 in FIG. 4 is turned on as a result of an occupant boarding the automobile 1, the monitoring controller 31 repeatedly executes the process in FIG. 8.

In step ST1 of the normal monitoring control in FIG. 8, the monitoring controller 31 determines whether an occupant has boarded the automobile 1. The monitoring controller 31 repeats step ST1 until the monitoring controller 31 determines that an occupant has boarded the automobile 1.

When an occupant boards the automobile 1 and sits on the corresponding seat 5, the onboard imaging device 53 periodically repeats imaging, thereby capturing an image of the occupant sitting on the seat 5.

In step ST2, the monitoring controller 31 uses, for example, the setting data 58 for the occupant stored in the monitor memory 51 so as to identify the face of the occupant appearing in the image captured by the onboard imaging device 53.

In step ST3, the monitoring controller 31 uses, for example, the setting data 58 for the occupant stored in the monitor memory 51 so as to execute a setting process corresponding to the identified occupant. For example, the monitoring controller 31 uses the lens actuator 57 to adjust the position of the lens 56 in the optical unit 52 within the normal control range. Consequently, the light projector 54 is capable of projecting infrared light at a wide angle onto the entire upper body of the occupant, as illustrated in FIG. 6A. The monitoring controller 31 outputs either one of an identification number of the recognized occupant and the setting data 58 to the vehicle-interior network 21. Accordingly, for example, the operable device 14 adjusts the steering wheel 7 to a previously set position for the recognized occupant, the support controller 32 performs a driving-support setting process corresponding to the past driving history of the recognized occupant, the protection controller 33 performs a protection-control setting process corresponding to the recognized occupant, the air conditioner starts air-conditioning operation in accordance with past settings designated by the recognized occupant, and so on.

After the above-described setting process performed at the time of boarding, the support controller 32 starts to monitor the occupant.

In step ST4, the monitoring controller 31 causes the light emitter 55 of each light projector 54 to emit light in accordance with normal light projection control. In normal light projection, the monitoring controller 31 causes the light emitter 55 to intermittently emit light. By emitting light intermittently, the light projector 54 starts to project infrared light at a wide angle onto the entire upper body of the occupant, as illustrated in FIG. 6A.

In step ST5, the monitoring controller 31 causes the onboard imaging device 53 to capture an image of the occupant sitting on the seat 5.

In step ST6, the monitoring controller 31 determines whether a warning is necessary. The monitoring controller 31 identifies the position and movement of the upper body of the occupant in the captured image, and determines whether the occupant is dozing or driving inattentively in accordance with the identified position and movement of the upper body. If the occupant is neither dozing nor driving inattentively, the monitoring controller 31 determines that a warning is not necessary and causes the process to proceed to step ST8. If the occupant is dozing and driving inattentively, the monitoring controller 31 determines that a warning is necessary and causes the process to proceed to step ST7.

In step ST7, the monitoring controller 31 executes a warning process for drawing the attention of the occupant. For example, the monitoring controller 31 displays a warning on the display device 13 and outputs a warning sound from the loudspeaker device 15.

In step ST8, the monitoring controller 31 determines whether the occupant has exited the automobile 1. When the occupant no longer appears in the image captured by the onboard imaging device 53, the monitoring controller 31 determines that the occupant has exited the automobile 1. If the occupant has not exited the automobile 1, the monitoring controller 31 causes the process to return to step ST5. The monitoring controller 31 repeats the above-described monitoring process for the occupant who has not exited the automobile 1 based on a subsequent image captured by the onboard imaging device 53. When the occupant has exited the automobile 1, the monitoring controller 31 ends the process in FIG. 8.

Figure 9:
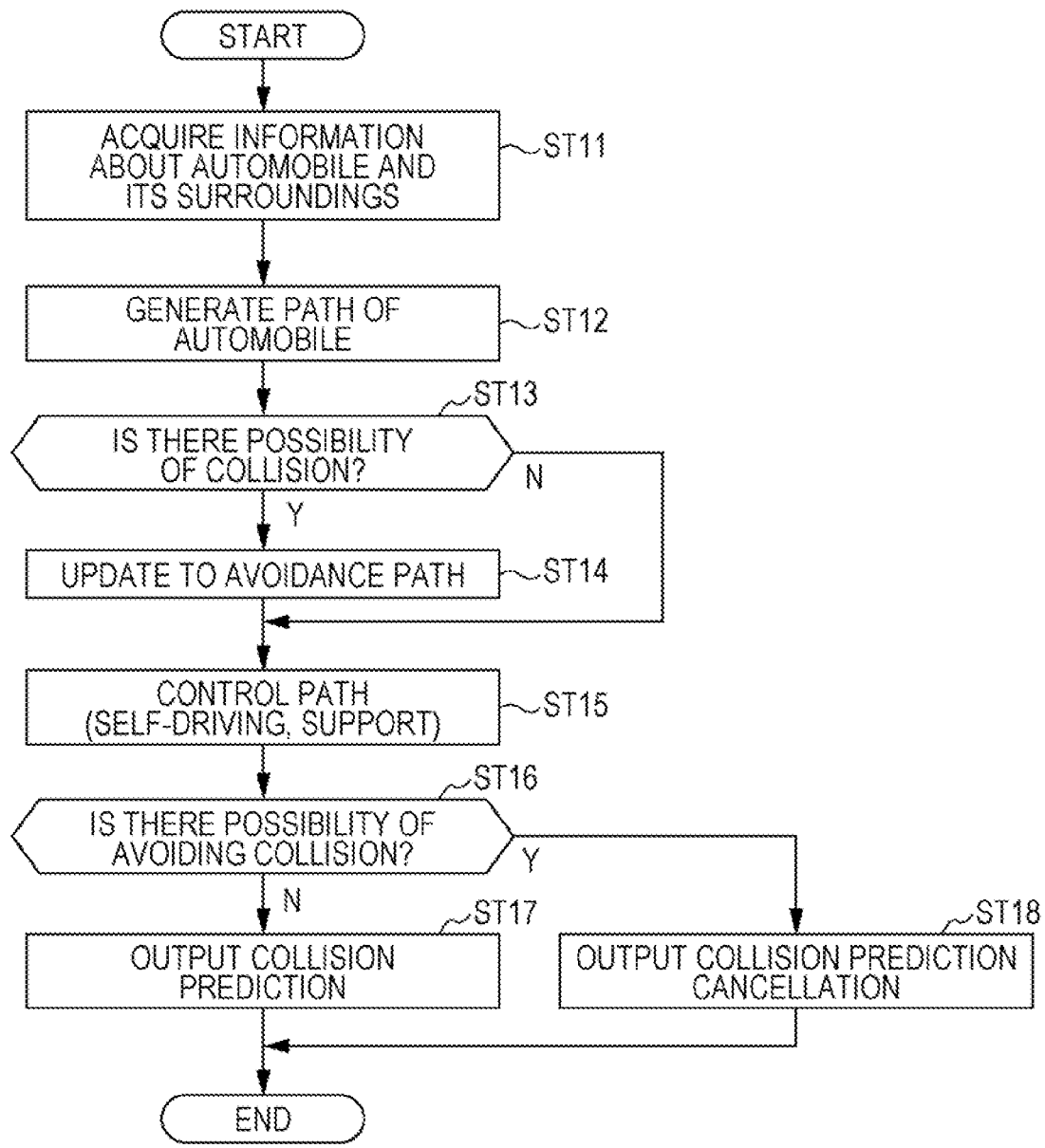
FIG. 9 is a flowchart illustrating a process performed by a support controller of a driving support device in FIG. 3.

FIG. 9 is a flowchart illustrating a process performed by the support controller 32 of the driving support device 40 in FIG. 3.

The support controller 32 repeats the process in FIG. 9 in a period in which the automobile 1 is running or has stopped.

In step ST11 of the driving support control in FIG. 9, the support controller 32 acquires information about the automobile 1 and its surroundings. For example, the support controller 32 acquires an image captured by the vehicle-exterior imaging device 16, movement data of another vehicle acquired by the communication controller 34 from the traffic system, a speed from the vehicle speed sensor 11, acceleration from the acceleration sensor 12, and path and route information from the support controller 32.

In step ST12, the support controller 32 generates a path of the automobile 1 based on the acquired information about the driving of the automobile 1. For example, the support controller 32 generates a most recent path based on the route information of the automobile 1.

In step ST13, the support controller 32 determines whether there is a possibility of a collision between another moving object, such as another vehicle, and the automobile 1. For example, the support controller 32 generates a path of the moving object from either one of the captured image and the movement data and determines whether the path of the moving object intersects with or comes close to the most recent path of the automobile 1. Then, if the most recent path of the automobile 1 and the path of the moving object intersect with or come close to each other, the support controller 32 determines that there is a possibility of a collision, and causes the process to proceed to step ST14. If the most recent path of the automobile 1 and the path of the moving object do not intersect with or come close to each other, the support controller 32 determines that there is no possibility of a collision, and causes the process to proceed to step ST15.

In step ST14, the support controller 32 updates the path generated in step ST12 such that the path is less likely to intersect with or come close to the path of the moving object. The support controller 32 updates the generated path such that, for example, the automobile 1 accelerates, decelerates, and stops along the path.

In step ST15, the support controller 32 controls the driving of the automobile 1 in accordance with the generated or updated path. The support controller 32 prioritizes the updated path over the generated path. If the automobile 1 is traveling in a self-driving mode, the support controller 32 causes the automobile 1 to travel along the generated or updated path. If the occupant operates the operable device 14, such as the steering wheel 7, the support controller 32 adjusts the operational amount in accordance with the generated or updated path, and causes the automobile 1 to travel accordingly.

In step ST16, the support controller 32 determines whether there is a possibility of avoiding a collision in a controlled driving mode. The support controller 32 acquires information from a sensor of the automobile 1, such as a most recent image captured by the vehicle-exterior imaging device 16, and determines whether there is a possibility of avoiding a collision with another moving object. Since the automobile 1 normally moves in accordance with the path updated in step ST14 to avoid a collision, the automobile 1 is capable of avoiding a collision with the moving object.

However, for example, if the moving object moves unexpectedly, there is a possibility of a collision even if the automobile 1 moves in accordance with the updated path. The support controller 32 determines whether there is a possibility of avoiding a collision in accordance with, for example, relative movement of the moving object appearing in the captured image. The process of determining whether there is a possibility of avoiding a collision in step ST16 is stricter than the process of predicting a possibility of a collision in step ST14 and is for determining a possibility of whether a collision may actually occur. If there is no possibility of avoiding a collision, the support controller 32 causes the process to proceed to step ST17. If there is a possibility of avoiding a collision, the support controller 32 causes the process to proceed to step ST18.

In step ST17, the support controller 32 outputs a collision prediction to the vehicle-interior network 21. Subsequently, the support controller 32 ends the driving support control in FIG. 9.

In step ST18, the support controller 32 outputs a collision prediction cancellation to the vehicle-interior network 21. Subsequently, the support controller 32 ends the driving support control in FIG. 9.

According to the above-described process, the support controller 32 outputs a collision prediction in step ST17 if the support controller 32 determines that a collision may actually occur. If the support controller 32 determines that a collision may not actually occur, the support controller 32 outputs a collision prediction cancellation in step ST18.

Figure 10:
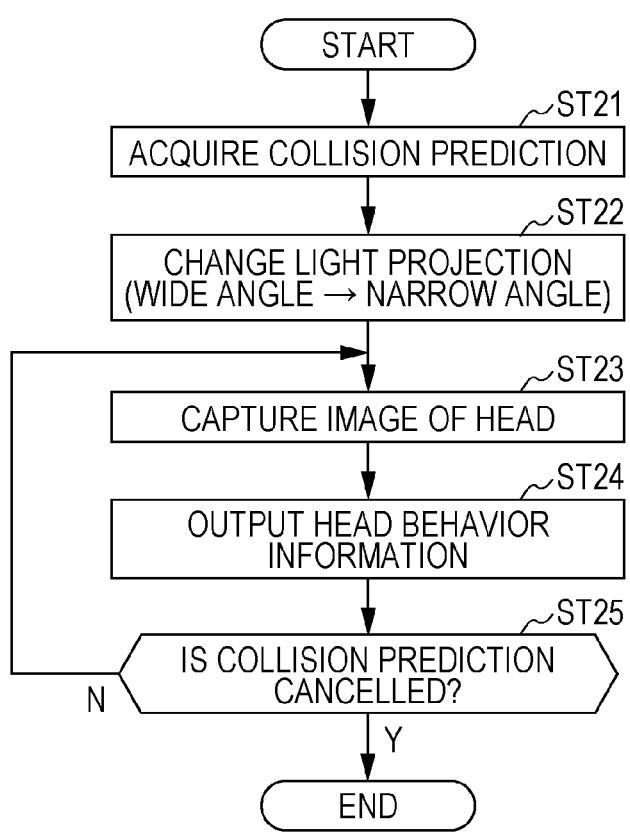
FIG. 10 is a flowchart illustrating a process performed by the monitoring controller in FIG. 5 when a collision is predicted.

FIG. 10 is a flowchart illustrating a process performed by the monitoring controller 31 in FIG. 5 when a collision is predicted.

If the monitoring controller 31 receives the collision prediction output in step ST17, the monitoring controller 31 executes the process in FIG. 10. The monitoring controller 31 repeats the process in FIG. 10 every time the monitoring controller 31 newly receives the collision prediction output in step ST17.

In step ST21 in the process in FIG. 10 corresponding to when a collision is predicted, the monitoring controller 31 acquires the collision prediction output in step ST17.

When the collision prediction is acquired, the monitoring controller 31 starts occupant monitoring control for protecting the occupant during a collision.

In step ST22, the monitoring controller 31 changes the light projection mode of each light projector 54.

In detail, the monitoring controller 31 uses the lens actuator 57 to drive the lens 56 from the position within the normal control range, as illustrated in FIG. 6A, to the position outside the normal control range, as illustrated in FIG. 6B. This causes the light projection area of the light projector 54 to change from a state where light is projected at a wide angle onto the entire upper body of the occupant sitting on the seat 5 to a state where light is projected at a narrow angle to the occupant's head and its surrounding area. The light projection area of the light projector 54 is limited to a reduced range.

Furthermore, in order to increase the amount of light to be radiated onto the head of the occupant, the monitoring controller 31 may further execute light-projection switching control.

For example, the monitoring controller 31 may switch the light emitter 55 of the light projector 54 from a normal intermittent lighting mode to a continuous lighting mode.

As another alternative, for example, the monitoring controller 31 may cause the light emitter 55 to emit light with high intensity such that the light emitter 55 cannot continue to emit light over a long period of time.

By performing such switching control for increasing the amount of light to be radiated onto the head of the occupant, if a collision of the automobile 1 is predicted, the light projector 54 can radiate intense light with a reduced light projection area than in the normal mode toward the head of the occupant whose image is to be captured by the onboard imaging device 53.

In step ST23, the monitoring controller 31 captures an image of the head of the occupant irradiated with the continuous intense light. The monitoring controller 31 clips out a regional image including the head of the occupant from the image captured by the onboard imaging device 53.

In step ST24, the monitoring controller 31 identifies the position and movement of the head from the clipped image of the head of the occupant and outputs head behavior information based on the identified head behavior to the vehicle-interior network 21. For example, the monitoring controller 31 identifies the position of the head in the occupant compartment 4 in accordance with the imaged position of the head in the clipped regional image. The monitoring controller 31 identifies the movement of the head in the occupant compartment 4 in accordance with changes in the imaged position of the head in a plurality of regional images. The monitoring controller 31 predicts the behavior of the head in the occupant compartment 4, assuming that the head moves linearly at a speed according to the amount of identified movement of the head in the direction of movement of the head identified from the identified position of the head. The monitoring controller 31 outputs predicted head behavior data in the occupant compartment 4 as the behavior information to the vehicle-interior network 21.

In step ST25, the monitoring controller 31 determines whether the collision prediction is cancelled.

If the monitoring controller 31 has not acquired the collision prediction cancellation output in step ST18, the monitoring controller 31 determines that the collision prediction is not cancelled and causes the process to return to step ST23. The monitoring controller 31 repeats the process from step ST23 to step ST25 until the collision prediction is cancelled, and repeatedly outputs the behavior information based on the most-recent regional image of the head.

When the monitoring controller 31 acquires the collision prediction cancellation output in step ST18, the monitoring controller 31 determines that the collision prediction is cancelled, and ends the process in FIG. 10 corresponding to when a collision is predicted.

Figure 11:
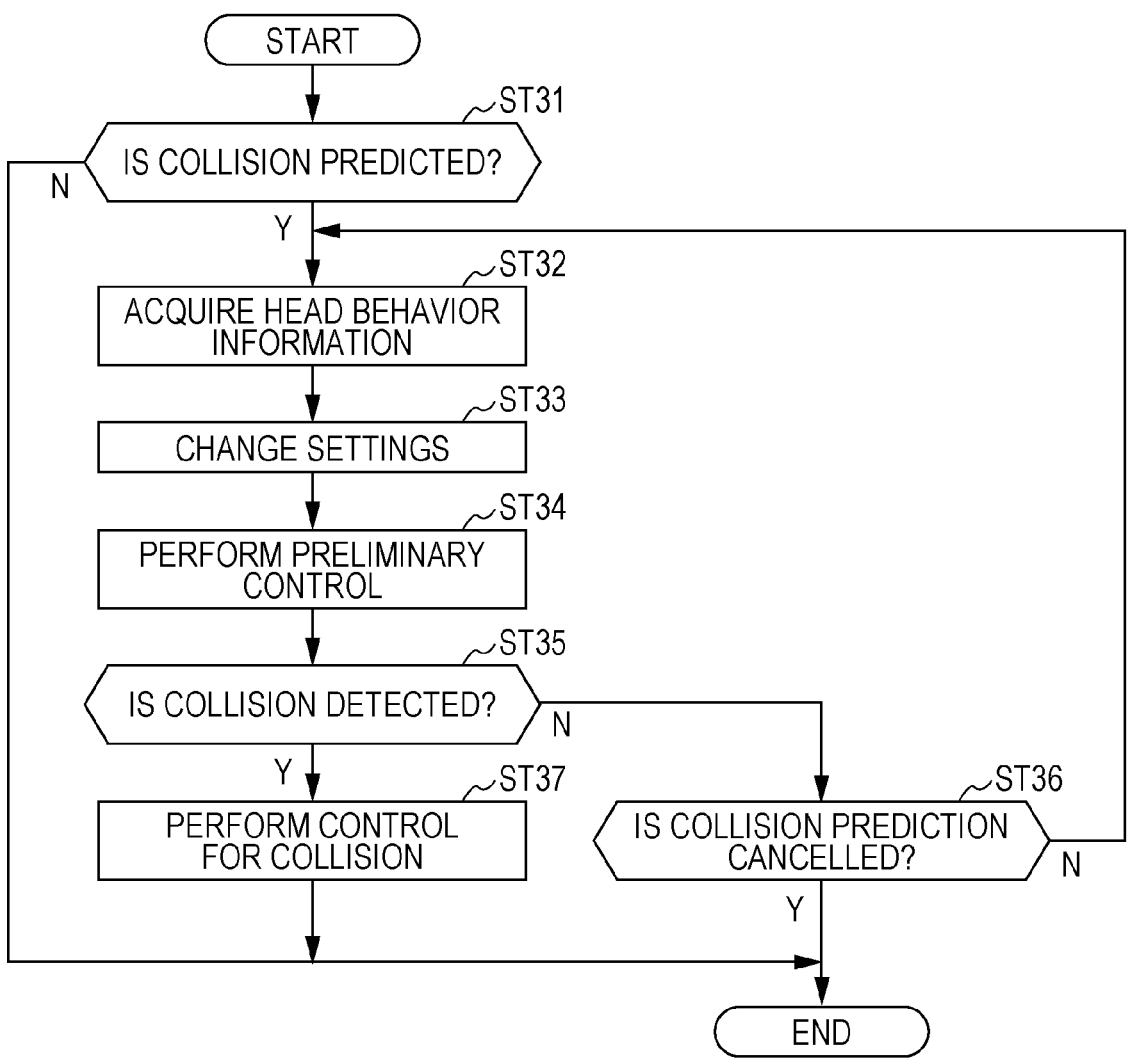
FIG. 11 is a flowchart illustrating a process performed by a protection controller in FIG. 7.

FIG. 11 is a flowchart illustrating a process performed by the protection controller 33 in FIG. 7.

The protection controller 33 for occupants executes the process in FIG. 11 when the protection controller 33 receives the collision prediction output in step ST17. The protection controller 33 repeats the process in FIG. 11 every time the protection controller 33 newly receives the collision prediction output in step ST17.

In step ST31 in the occupant protection process in FIG. 11, the protection controller 33 determines whether the collision prediction output in step ST17 is acquired.

If the collision prediction is not acquired, the protection controller 33 ends the occupant protection process in FIG. 11.

If the collision prediction is acquired, the protection controller 33 causes the process to proceed to step ST32.

In step ST32, the protection controller 33 acquires the most-recent behavior information output in step ST24.

In step ST33, the protection controller 33 changes the setting data 69 in the protection memory 61 based on the acquired most-recent behavior information.

For example, the protection controller 33 updates the setting data 69 with regard to the start timing for actuating the belt actuators 63, the setting for whether the first inflators 67 are to be actuated, the start timing for actuating the first inflators 67, the setting for whether the second inflators 68 are to be actuated, and the start timing for actuating the second inflators 68, based on a behavior prediction of the heads of the occupants included in the behavior information.

Furthermore, based on the behavior prediction and the head position of the occupants included in the behavior information, the protection controller 33 uses the airbag actuators 66 to drive the base members 65 such that the airbags deploy in the direction in which the occupants' heads tilt due to an impact of a collision.

In step ST34, the protection controller 33 executes preliminary control prior to collision detection based on the fact that a collision is predicted.

In preliminary control, for example, the protection controller 33 actuates the belt actuators 63 to pull in the seatbelts 62, thereby causing the seatbelts 62 to come into contact with the occupants.

In step ST35, the protection controller 33 determines whether a collision is detected. For example, the protection controller 33 determines whether a collision is detected based on whether excessive acceleration corresponding to an impact of a collision is detected by the acceleration sensor 12.

If a collision is not detected, the protection controller 33 determines in step ST36 whether the collision prediction is cancelled in step ST18. If the collision prediction is cancelled, the protection controller 33 ends the occupant protection process in FIG. 11. If the collision prediction is not cancelled, the protection controller 33 causes the process to return to step ST32. The protection controller 33 repeats the process from step ST32 to step ST36 until the protection controller 33 determines that a collision is detected or the collision prediction is cancelled. For example, the protection controller 33 changes the settings in accordance with the behavior of the heads of the occupants immediately before a collision and executes the preliminary control.

If a collision is detected, the protection controller 33 executes control in step ST37 for coping with the collision.

In the control for coping with the collision, for example, the protection controller 33 causes the belt actuators 63 to apply tension to the seatbelts 62. The protection controller 33 actuates the first inflators 67 and the second inflators 68 in accordance with the settings. This causes the airbags 64 to deploy. The kinetic energy of the occupants during the collision may be absorbed by the seatbelts 62 and the airbags 64.

Accordingly, in this embodiment, when a collision of the automobile 1 is predicted, each light projector 54 of the occupant monitoring device 50 of the automobile 1 radiates, for occupant protection control, intense light with a reduced light projection area than in the normal mode toward the head of the corresponding occupant whose image is to be captured by the onboard imaging device 53. For example, when a collision of the automobile 1 is predicted, the light projector 54 switches the wide-angle light used in the normal case where a collision of the automobile 1 is not predicted to narrow-angle light. The intense narrow-angle light with a reduced light projection area than in the normal mode is radiated from the light projector 54 toward the head of the occupant whose image is to be captured by the onboard imaging device 53.

In this embodiment, when a collision of the automobile 1 is predicted, the lens actuator 57 drives the lens 56 as an optical member, and light with a reduced light projection area than in the normal mode is focused from the light emitter 55 onto the head of the occupant sitting on the seat 5. Specifically, when a collision of the automobile 1 is predicted, the lens actuator 57 positionally drives the lens 56 out of the normal adjustment range for projecting light onto the entire upper body of the occupant sitting on the seat 5 so that the behavior of the upper body of the occupant is included in the captured image. The light from the light emitter 55 is reduced from the normal wide angle to the narrow angle and is focused onto the head of the occupant sitting on the seat 5.

Thus, the head of the occupant in the image captured by the onboard imaging device 53 is clearer than in the normal mode.

As a result, in this embodiment, the head of each occupant sitting on the corresponding seat 5 in the captured image can be readily identified, so that the position and behavior of the head of the occupant can be properly presumed. When a collision of the automobile 1 is predicted, for example, the occupant protection device 60 properly predicts the position and movement of the head of the occupant during the collision based on the clearly captured image of the head of the occupant, and can execute appropriate occupant protection control. The occupant protection device 60 becomes capable of executing proper occupant protection control that can be expected as a result of using the occupant monitoring device 50. For example, in this embodiment, when the captured image is to be processed, the head irradiated with intense light in the captured image can be reliably identified within a short processing time, regardless of the imaging environment, without being interrupted by the process for identifying the head included in the captured image. In this embodiment, the robustness of facial detection can be improved.

Furthermore, in this embodiment, facial identification based on the captured image can be completed stably and quickly, regardless of the imaging environment, so that, for example, subsequent occupant protection control can be commenced quickly. For example, the lead time from when the imaging is performed to when the occupant protection control is commenced can be stably maintained to a substantially short period of time, regardless of the imaging environment.

In contrast, for example, supposing that the head is to be identified from a normal captured image, the face in the image is dark and blends with the surroundings, possibly causing the process to be time consuming due to increased load for image processing for head identification and the face to be unidentifiable depending on the circumstances.

In this embodiment, the light projectors 54 project non-visible infrared light toward the heads of the occupants sitting on the seats 5. Thus, in this embodiment, even if the heads are irradiated with intense light, the visibility of the occupants is less likely to be obstructed.

The above-described embodiment is merely an embodiment of the disclosure and is not limited thereto. Various modifications and alterations are possible within the scope of the disclosure.

For example, in the above-described embodiment, the occupant monitoring device 50 is coupled to the vehicle-interior network 21. Alternatively, for example, since the occupant monitoring device 50 is communicable with the wireless communication device 17, the occupant monitoring device 50 may exchange data with the occupant protection device 60. The occupant monitoring device 50 and the wireless communication device 17 may exchange data by a relatively-short-distance communication method compliant with, for example, the IEEE 802.1X standard. In this case, the occupant monitoring device 50 may be detachable from the automobile 1. The occupant monitoring device 50 detachable from the automobile 1 may be positioned and fixed to the occupant compartment 4 by using a mounter.

The invention claimed is:

1. An occupant monitoring device for a vehicle configured to monitor an occupant sitting on a seat provided in the vehicle, the occupant monitoring device comprising:
   a light projector configured to project light toward the occupant sitting on the seat;
   an imaging device configured to capture an image of the occupant sitting on the seat; and
   a processor configured to:
      receive collision prediction information that indicates prediction of a collision of the vehicle;
      control, based on the received collision prediction information that indicates the prediction of the collision of the vehicle, the light projector to project intense light toward a head of the occupant to be imaged by the imaging device; and
      control, based on the projection of the intense light, the imaging device to capture the image of the head of the occupant sitting on the seat.

2. The occupant monitoring device for the vehicle according to claim 1,
   wherein the light projector is switchable between a wide-angle light projection mode and a narrow-angle light projection mode,
   wherein, in a normal case where the collision of the vehicle is not predicted, the processor causes the light projector to radiate wide-angle light onto the occupant who is sitting on the seat and who is to be imaged by the imaging device, and
   wherein, in a case where the collision of the vehicle is predicted, the processor causes the light projector to project intense narrow-angle light toward the head of the occupant to be imaged by the imaging device.

3. The occupant monitoring device for the vehicle according to claim 1, wherein the light projector comprises:
   a light emitter;
   an optical member configured to focus light from the light emitter and project the focused light toward the occupant sitting on the seat; and
   an actuator configured to drive the optical member,
   wherein, in a case where the collision of the vehicle is predicted, the processor causes the actuator to drive the optical member to narrow the light from the light emitter and to focus the light onto the head of the occupant sitting on the seat.

4. The occupant monitoring device for the vehicle according to claim 2, wherein the light projector comprises:
   a light emitter;
   an optical member configured to focus light from the light emitter and project the focused light toward the occupant sitting on the seat; and
   an actuator configured to drive the optical member, and
   wherein, in a case where the collision of the vehicle is predicted, the processor causes the actuator to drive the optical member to narrow the light from the light emitter and to focus the light onto the head of the occupant sitting on the seat.

5. The occupant monitoring device for the vehicle according to claim 3, wherein, in a case where the collision of the vehicle is predicted, the processor causes the actuator to:
   drive the optical member so that the optical member is positioned out of a normal position for projecting light onto an entire upper body of the occupant sitting on the seat,
   drive the optical member to narrow the light from the light emitter from a normal wide angle to a narrow angle, and
   drive the optical member to focus the light onto the head of the occupant sitting on the seat.

6. The occupant monitoring device for the vehicle according to claim 4, wherein, in a case where the collision of the vehicle is predicted, the processor causes the actuator to:
   drive the optical member so that the optical member is positioned out of a normal position for projecting light onto an entire upper body of the occupant sitting on the seat,
   drive the optical member to narrow the light from the light emitter from a normal wide angle to a narrow angle, and
   drive the optical member to focus the light onto the head of the occupant sitting on the seat.

7. The occupant monitoring device for the vehicle according to claim 1, wherein the light projector projects nonvisible light toward the head of the occupant sitting on the seat.

8. The occupant monitoring device for the vehicle according to claim 2, wherein the light projector projects nonvisible light toward the head of the occupant sitting on the seat.

9. The occupant monitoring device for the vehicle according to claim 3, wherein the light projector projects nonvisible light toward the head of the occupant sitting on the seat.

10. The occupant monitoring device for the vehicle according to claim 4, wherein the light projector projects nonvisible light toward the head of the occupant sitting on the seat.

11. An occupant protection system for a vehicle comprising:
    the occupant monitoring device for the vehicle according to claim 1; and
    an occupant protection device configured to execute occupant protection control based on the image of the occupant captured by the occupant monitoring device.

12. An occupant protection system for a vehicle comprising:
    the occupant monitoring device for the vehicle according to claim 2; and
    an occupant protection device configured to execute occupant protection control based on the image of the occupant captured by the occupant monitoring device.

13. An occupant protection system for a vehicle comprising:
    the occupant monitoring device for the vehicle according to claim 3; and
    an occupant protection device configured to execute occupant protection control based on the image of the occupant captured by the occupant monitoring device.

14. An occupant protection system for a vehicle comprising:
    the occupant monitoring device for the vehicle according to claim 4; and an occupant protection device configured to execute occupant protection control based on the image of the occupant captured by the occupant monitoring device.

* * * * *